US009855794B1

(12) United States Patent
Nakajima et al.

(10) Patent No.: US 9,855,794 B1
(45) Date of Patent: Jan. 2, 2018

(54) BICYCLE HUB ASSEMBLY

(71) Applicant: Shimano Inc., Sakai, Osaka (JP)

(72) Inventors: Jun Nakajima, Osaka (JP); Kazuki Koshiyama, Osaka (JP)

(73) Assignee: SHIMANO INC., Osaka (JP)

( * ) Notice: Subject to any disclaimer, the term of this patent is extended or adjusted under 35 U.S.C. 154(b) by 4 days.

(21) Appl. No.: 15/241,072

(22) Filed: Aug. 19, 2016

(51) Int. Cl.
| *B60B 27/04* | (2006.01) |
| *B60B 27/02* | (2006.01) |
| *B62M 9/10* | (2006.01) |
| *B62K 3/00* | (2006.01) |
| *B62M 1/36* | (2013.01) |

(52) U.S. Cl.
CPC ............ *B60B 27/04* (2013.01); *B60B 27/023* (2013.01); *B62K 3/00* (2013.01); *B62M 1/36* (2013.01); *B62M 9/10* (2013.01)

(58) Field of Classification Search
CPC ........ B60B 27/04; B60B 27/023; B62M 1/36; B62M 9/10; B62K 3/00
USPC ..................................... 301/59, 110.5, 124.2
See application file for complete search history.

(56) References Cited

U.S. PATENT DOCUMENTS

| 2006/0040776 A1* | 2/2006 | Hansen .................. B60B 27/023 474/160 |
| 2006/0158022 A1* | 7/2006 | Nicolai ............... B60B 27/0005 301/110.5 |
| 2014/0265539 A1* | 9/2014 | Thompson ............ B60B 27/023 301/110.5 |
| 2016/0039491 A1* | 2/2016 | Morelli ..................... B62L 1/00 280/288 |

* cited by examiner

*Primary Examiner* — S. Joseph Morano
*Assistant Examiner* — Jean Charleston
(74) *Attorney, Agent, or Firm* — Shinjyu Global IP

(57) ABSTRACT

The bicycle hub assembly includes a hub axle, a hub body, and a rear-sprocket supporting member. A first axial length is defined between a first axial frame abutment surface of the hub axle and an axially rear-sprocket abutment surface of the rear-sprocket supporting member in the axial direction. The first axial length is smaller than or equal to 38.00 mm. A second axial length is defined between a first axially outer part 70b of the hub body and a second axially outer part 71b of a second spoke-mounting portion 71 of the hub body in the axial direction. The second axial length is larger than or equal to 55.00 mm.

28 Claims, 4 Drawing Sheets

BICYCLE HUB ASSEMBLY

BACKGROUND

Technical Field

The technology disclosed herein relates to a bicycle hub assembly.

Background Information

Bicycling is becoming a popular form of recreation as well as a means of transportation. Also, bicycling has become a popular competitive sport for both amateurs and professionals. Regardless of the bicycle is used for the recreation, the transportation or the competition, the bicycle industry is constantly improving the various components of the bicycle.

For example, the hub assembly has been redesigned over the past years. Hub assemblies are constantly being improved to stably rotate a rear wheel.

Rotational stability of the rear wheel is affected by configuration of the hub assembly, for example, an axial length between hub flanges to which spokes of the wheel are attached.

Specifically, lateral rigidity (including torsional rigidity) of the rear wheel becomes small as the axial length between hub flanges becomes short. In case that the axial length is shorter than the predetermined axial length, the lateral rigidity of the rear wheel might need to be enhanced more or less to effectively riding a bicycle. Therefore, it is one desire to provide a rear hub assembly capable of ensuring sufficient lateral rigidity of the rear wheel.

In consideration of the problem, it is an object of the present invention to provide a bicycle hub assembly capable of ensuring sufficient lateral rigidity of a wheel.

SUMMARY

In accordance with a first aspect of the present invention, a bicycle hub assembly is configured to mount a bicycle rear sprocket assembly thereto. The bicycle hub assembly comprises a hub axle, a hub body, and a rear-sprocket supporting member.

The hub body is rotatably supported around the hub axle with respect to a rotational center axis of the bicycle hub assembly. The hub body includes a first spoke-mounting portion and a second spoke-mounting portion. The first spoke-mounting portion includes a first axially outer part. The second spoke-mounting portion includes a second axially outer part.

The rear-sprocket supporting member is rotatably supported around the hub axle with respect to the rotational center axis. The rear-sprocket supporting member is configured to support a plurality of bicycle rear sprockets.

The rear-sprocket supporting member includes a first axial end, a second axial end, and an axially rear-sprocket abutment surface. The second axial end is opposite to the first axial end in an axial direction parallel to the rotational center axis. The second axial end is positioned closer to the hub body than the first axial end in the axial direction. The axially rear-sprocket abutment surface is positioned in the second axial end.

The hub axle includes a first axial frame abutment surface and a second axial frame abutment surface. The first axial frame abutment surface is configured to abut against a first part of a bicycle frame in the axial direction in a state where the bicycle hub assembly is mounted to the bicycle frame.

The second axial frame abutment surface is configured to abut against a second part of the bicycle frame in the axial direction in the state where the bicycle hub assembly is mounted to the bicycle frame.

The first axial frame abutment surface is positioned closer to the rear-sprocket supporting member than the second axial frame abutment surface in the axial direction.

A first axial length is defined between the first axial frame abutment surface and the axially rear-sprocket abutment surface of the rear-sprocket supporting member in the axial direction. The first axial length is smaller than or equal to 38.00 mm.

A second axial length is defined between the first axially outer part of the first spoke-mounting portion and the second axially outer part of the second spoke-mounting portion in the axial direction. The second axial length is larger than or equal to 55.00 mm.

Herewith, the bicycle hub assembly is capable of ensuring sufficient lateral rigidity of a wheel, because the second axial length is larger sufficiently.

In accordance with a second aspect of the present invention, the bicycle hub assembly according to the first aspect may be configured as follows. A third axial length is defined between the first axial frame abutment surface and the second axial frame abutment surface. Herewith, the bicycle hub assembly is capable of ensuring sufficient lateral rigidity of the wheel.

In accordance with a third aspect of the present invention, the bicycle hub assembly according to the second aspect may be configured as follows. The third axial length is smaller than or equal to 145.00 mm.

Herewith, the bicycle hub assembly is capable of being attached to a bicycle frame with an over lock dimension which is smaller than or equal to 145.00 mm, and ensuring sufficient lateral rigidity of the wheel.

In accordance with a fourth aspect of the present invention, the bicycle hub assembly according to the third aspect may be configured as follows. The third axial length is larger than or equal to 130.00 mm.

Herewith, the bicycle hub assembly is capable of being attached to a bicycle frame with an over lock dimension which is larger than or equal to 130.00 mm and is smaller than or equal to 145.00 mm, and ensuring sufficient lateral rigidity of the wheel.

In accordance with a fifth aspect of the present invention, the bicycle hub assembly according to the first aspect may be configured as follows. The first axial length is smaller than or equal to 37.00 mm.

Herewith, the second axial length further becomes large. In other words, the bicycle hub assembly is capable of ensuring sufficient lateral rigidity of the wheel.

In accordance with a sixth aspect of the present invention, the bicycle hub assembly according to the first aspect may be configured as follows. The first axial length is smaller than or equal to 36.00 mm.

Herewith, the second axial length further becomes large. In other words, the bicycle hub assembly is capable of ensuring sufficient lateral rigidity of the wheel.

In accordance with a seventh aspect of the present invention, the bicycle hub assembly according to the first aspect may be configured as follows. The first axial length is larger than or equal to 15.00 mm.

Herewith, the required minimum number of the bicycle rear sprockets is capable of being attached to the rear-sprocket supporting member.

In accordance with an eighth aspect of the present invention, the bicycle hub assembly according to the first aspect may be configured as follows. The first axial length is larger than or equal to 20.00 mm.

Herewith, the required number of the bicycle rear sprockets is capable of being attached to the rear-sprocket supporting member.

In accordance with a ninth aspect of the present invention, the bicycle hub assembly according to the first aspect may be configured as follows. The second axial length is larger than or equal to 60.00 mm.

Herewith, the bicycle hub assembly is capable of ensuring further sufficient lateral rigidity of the wheel, because the second axial length further becomes large.

In accordance with a tenth aspect of the present invention, the bicycle hub assembly according to the first aspect may be configured as follows. The second axial length is larger than or equal to 64.00 mm.

Herewith, the bicycle hub assembly is capable of ensuring the further sufficient lateral rigidity of the wheel, because the second axial length further becomes large.

In accordance with an eleventh aspect of the present invention, the bicycle hub assembly according to the first aspect may be configured as follows. The second axial length is smaller than or equal to 85.00 mm.

Herewith, a bicycle sprocket assembly having a minimum necessary number of bicycle rear sprockets can be attached to the rear-sprocket supporting member within the range of the first axial length which is dependently determined by setting the second axial length to the above numerical value.

In accordance with a twelfth aspect of the present invention, the bicycle hub assembly according to the first aspect may be configured as follows. The second axial length is smaller than or equal to 80.00 mm.

Herewith, a bicycle sprocket assembly having a number of necessary bicycle rear sprockets can be attached to the rear-sprocket supporting member within the range of the first axial length which is dependently determined by setting the second axial length to the above numerical value.

In accordance with a thirteenth aspect of the present invention, the bicycle hub assembly according to the first aspect may be configured as follows. The second axial length is smaller than or equal to 70.00 mm.

Herewith, a bicycle sprocket assembly having a number of necessary bicycle rear sprockets can be attached to the rear-sprocket supporting member within the range of the first axial length which is dependently determined by setting the second axial length to the above numerical value.

In accordance with a fourteenth aspect of the present invention, the bicycle hub assembly according to the first aspect further comprises a first axial centerline. The first axial centerline is defined between the first axial frame abutment surface and the second axial frame abutment surface in the axial direction. The hub body includes a second axial centerline defined between the first axially outer part of the first spoke-mounting portion and the second axially outer part of the second spoke-mounting portion.

A loss of tension of the spokes can be suppressed by adjusting a length between the first axial centerline and the second axial centerline.

In accordance with a fifteenth aspect of the present invention, the bicycle hub assembly according to the fourteenth aspect may be configured as follows. A fourth axial length defined between the first axial centerline and the second axial centerline in the axial direction is smaller than or equal to 6.00 mm.

A loss of tension of the spokes can be suppressed by setting the above fourth axial length.

In accordance with a sixteenth aspect of the present invention, the bicycle hub assembly according to the fifteenth aspect may be configured as follows. The fourth axial length is smaller than or equal to 5.00 mm.

A loss of tension of the spokes can be effectively suppressed by setting the above fourth axial length.

In accordance with a seventeenth aspect of the present invention, the bicycle hub assembly according to the fifteenth aspect may be configured as follows. The fourth axial length is smaller than or equal to 0.00 mm.

A loss of tension of the spokes can be further suppressed by setting the above fourth axial length.

In accordance with an eighteenth aspect of the present invention, the bicycle hub assembly according to the fourteenth aspect may be configured as follows. The first spoke-mounting portion is positioned closer to the rear-sprocket supporting member than the second spoke-mounting portion in the axial direction.

A fifth axial length is defined between the first axial centerline and the first axially outer part of the first spoke-mounting portion. The fifth axial length is smaller than a sixth axial length. The sixth axial length is defined between the first axial centerline and the second axially outer part of the second spoke-mounting portion. A bicycle sprocket assembly having a number of necessary bicycle rear sprockets can be attached to the rear-sprocket supporting member. Further, the bicycle hub assembly is capable of ensuring sufficient lateral rigidity of the wheel.

In accordance with a nineteenth aspect of the present invention, the bicycle hub assembly according to the fourteenth aspect may be configured as follows. The first spoke-mounting portion is positioned closer to the rear-sprocket supporting member than the second spoke-mounting portion in the axial direction.

A fifth axial length is defined between the first axial centerline and the first axially outer part of the first spoke-mounting portion. The fifth axial length is equal to a sixth axial length. The sixth axial length is defined between the first axial centerline and the second axially outer part of the second spoke-mounting portion.

A loss of tension of the spokes can be effectively suppressed by the above configuration.

In accordance with a twentieth aspect of the present invention, the bicycle hub assembly according to the first aspect further comprises a disc-rotor mounting portion.

Herewith, a disc-rotor is capable of being attached to the bicycle hub assembly which is capable of ensuring the lateral rigidity of the wheel.

In accordance with a twenty-first aspect of the present invention, the bicycle hub assembly according to the twentieth aspect may be configured as follows. The disc-rotor mounting portion is positioned opposite to the rear-sprocket supporting member with respect to the hub body in the axial direction.

Herewith, a disc-rotor is capable of being attached to the bicycle hub assembly which is capable of ensuring the lateral rigidity of the wheel.

In accordance with a twenty-second aspect of the present invention, the bicycle hub assembly according to the twentieth aspect may be configured as follows. The hub body includes a first hub flange and a second hub flange spaced apart from the first hub flange in the axial direction. The first spoke-mounting portion is disposed on the first hub flange. The second spoke-mounting portion is disposed on the second hub flange.

Herewith, the bicycle hub assembly including the hub flanges is capable of ensuring the lateral rigidity of the wheel.

In accordance with a twenty-third aspect of the present invention, the bicycle hub assembly according to the first aspect may be configured as follows. The rear-sprocket supporting member includes at least one axially extending spline configured to engage with the plurality of bicycle rear sprockets.

Herewith, the bicycle hub assembly can be reduced in weight. Also, the bicycle rear sprockets is capable of being easily attached to the bicycle hub assembly and being easily detached from the bicycle hub assembly.

In accordance with a twenty-fourth aspect of the present invention, the bicycle hub assembly according to the twenty-third aspect may be configured as follows. The at least one axially extending spline includes a plurality of axially extending splines.

Herewith, the bicycle hub assembly is capable of surely receiving a rotational torque from the bicycle rear sprockets during pedaling.

In accordance with a twenty-fifth aspect of the present invention, a bicycle hub assembly is configured to mount a bicycle rear sprocket assembly thereto. The bicycle hub assembly comprises a hub axle, a hub body, and a rear-sprocket supporting member.

The hub body is rotatably supported around the hub axle with respect to a rotational center axis of the bicycle hub assembly. The hub body includes a first spoke-mounting portion and a second spoke-mounting portion. The first spoke-mounting portion includes a first axially outer part. The second spoke-mounting portion includes a second axially outer part.

The rear-sprocket supporting member is rotatably supported around the hub axle with respect to the rotational center axis. The rear-sprocket supporting member is configured to support a plurality of bicycle rear sprockets.

The rear-sprocket supporting member includes a first axial end, a second axial end, and an axially rear-sprocket abutment surface. The second axial end is opposite to the first axial end in an axial direction parallel to the rotational center axis. The second axial end is positioned closer to the hub body than the first axial end in the axial direction. The axially rear-sprocket abutment surface is positioned in the second axial end.

The hub axle includes a first axial frame abutment surface and a second axial frame abutment surface. The first axial frame abutment surface is configured to abut against a first part of a bicycle frame in the axial direction in a state where the bicycle hub assembly is mounted to the bicycle frame.

The second axial frame abutment surface is configured to abut against a second part of the bicycle frame in the axial direction in the state where the bicycle hub assembly is mounted to the bicycle frame.

The first axial frame abutment surface is positioned closer to the rear-sprocket supporting member than the second axial frame abutment surface in the axial direction.

A first axial length is defined between the first axial frame abutment surface and the axially rear-sprocket abutment surface of the rear-sprocket supporting member in the axial direction. The first axial length is smaller than or equal to 40.00 mm.

A second axial length is defined between the first axially outer part of the first spoke-mounting portion and the second axially outer part of the second spoke-mounting portion in the axial direction. The second axial length is larger than or equal to 60.00 mm A third axial length is defined between the first axial frame abutment surface and the second axial frame abutment surface. The third axial length is larger than 140.00 mm and smaller than or equal to 150.00 mm.

Herewith, the bicycle hub assembly is capable of being attached to a bicycle frame with an over lock dimension which is larger than or equal to 140.00 mm and is smaller than or equal to 150.00 mm, and capable of ensuring the lateral rigidity of the wheel.

In accordance with a twenty-sixth aspect of the present invention, the bicycle hub assembly according to the twenty-fifth aspect may be configured as follows. The first axial length is smaller than or equal to 38.00 mm.

Herewith, the second axial length becomes large. In other words, the bicycle hub assembly is capable of ensuring the lateral rigidity of the wheel.

In accordance with a twenty-seventh aspect of the present invention, a bicycle hub assembly is configured to mount a bicycle rear sprocket assembly thereto. The bicycle hub assembly comprises a hub axle, a hub body, and a rear-sprocket supporting member.

The hub body is rotatably supported around the hub axle with respect to a rotational center axis of the bicycle hub assembly. The hub body includes a first spoke-mounting portion and a second spoke-mounting portion. The first spoke-mounting portion includes a first axially outer part. The second spoke-mounting portion includes a second axially outer part.

The rear-sprocket supporting member is rotatably supported around the hub axle with respect to the rotational center axis. The rear-sprocket supporting member is configured to support a plurality of bicycle rear sprockets.

The rear-sprocket supporting member includes a first axial end, a second axial end, and an axially rear-sprocket abutment surface. The second axial end is opposite to the first axial end in an axial direction parallel to the rotational center axis. The second axial end is positioned closer to the hub body than the first axial end in the axial direction. The axially rear-sprocket abutment surface is positioned in the second axial end.

The hub axle includes a first axial frame abutment surface and a second axial frame abutment surface. The first axial frame abutment surface is configured to abut against a first part of a bicycle frame in the axial direction in a state where the bicycle hub assembly is mounted to the bicycle frame.

The second axial frame abutment surface is configured to abut against a second part of the bicycle frame in the axial direction in the state where the bicycle hub assembly is mounted to the bicycle frame.

The first axial frame abutment surface is positioned closer to the rear-sprocket supporting member than the second axial frame abutment surface in the axial direction.

A first axial length is defined between the first axial frame abutment surface and the axially rear-sprocket abutment surface of the rear-sprocket supporting member in the axial direction. The first axial length is smaller than or equal to 40.00 mm.

A second axial length is defined between the first axially outer part of the first spoke-mounting portion and the second axially outer part of the second spoke-mounting portion in the axial direction. The second axial length is larger than or equal to 70.00 mm.

A third axial length is defined between the first axial frame abutment surface and the second axial frame abutment surface. The third axial length is larger than 148.00 mm and smaller than or equal to 160.00 mm.

Herewith, the bicycle hub assembly is capable of being attached to a bicycle frame with an over lock dimension which is larger than or equal to 148.00 mm and is smaller than or equal to 160.00 mm, and capable of ensuring the lateral rigidity of the wheel.

In accordance with a twenty-eighth aspect of the present invention, the bicycle hub assembly according to the twenty-seventh aspect may be configured as follows. The first axial length is smaller than or equal to 38.00 mm.

Herewith, the second axial length becomes large. In other words, the bicycle hub assembly is capable of ensuring the lateral rigidity of the wheel.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

<General Configuration of a Bicycle>

Figure 1:
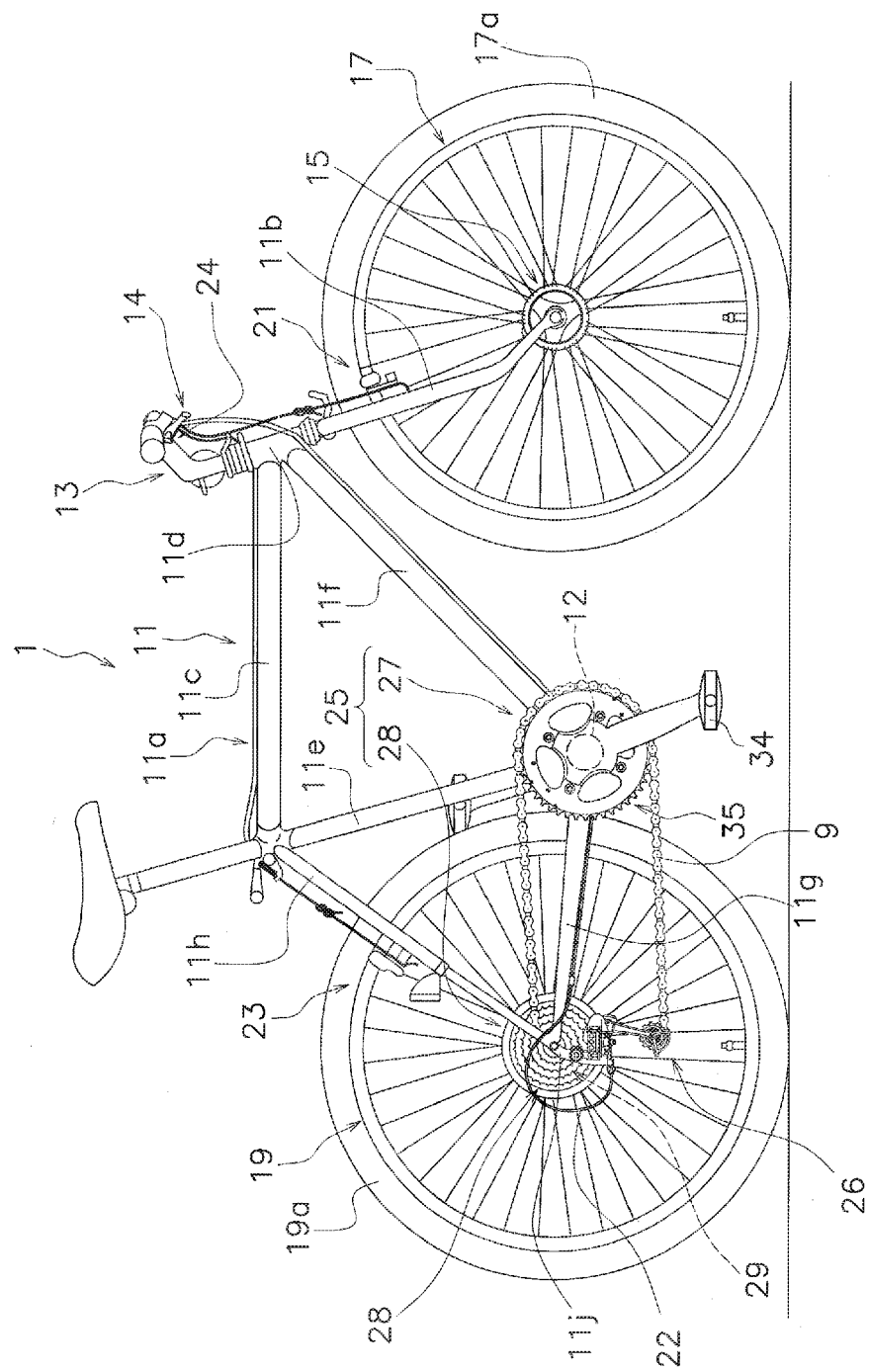
FIG. 1 is a side view of a bicycle according to an embodiment of the present invention.

As shown FIG. 1, a bicycle 1 includes a bicycle chain 9, a frame 11 (an example of a bicycle frame), a handle 13, a front hub assembly 15, front and rear wheels 17, 19, front and rear brake devices 21, 23, a shifting device 24, and a driving system 25.

The frame 11 includes a frame body 11a. The frame body 11a includes a top tube 11c, a head tube 11d, a seat tube 11e, a down tube 11f, a pair of chain stays 11g, a pair of seat stays 11h, and a bottom bracket hanger 12. A connection portion of the seat stay 11h and the chain stay 11g is described as a pair of rear ends 11j below. A front fork 11b is rotatably attached to the head tube 11d of the frame body 11a.

The handle 13 is fixed to the front fork 11b. The front hub assembly 15 is supported on the front fork 11b. The front wheel 17 is rotatably attached to the front fork 11b via the front hub assembly 15. The rear wheel 19 is rotatably attached to a rear portion of the frame 11 (the frame body 11a) via a rear hub assembly 29. A front tire 17a is attached to the front wheel 17. A rear tire 19a is attached to the rear wheels 19.

The front and rear brake devices 21, 23 are operated by a brake operating device 14. The shifting device 24 is attached to the handle 13. The shifting device 24 operates a rear derailleur 26 via a control cable 22. The rear derailleur 26 moves the bicycle chain 9 from one rear sprocket of a rear sprocket assembly 28 to an adjacent rear sprocket of the rear sprocket assembly 28 by a shifting device 24 attaching to, e.g. the right side of the handle 13. The rear sprockets are shown by a simplified description in FIG. 1. The rear derailleur 26 is, for example, attached to the rear end 11j of the frame 11.

<Configuration of the Driving System>

As shown in FIG. 1, the driving system 25 mainly includes a crank assembly 27 and the rear sprocket assembly 28. Specifically, the driving system 25 mainly includes a crank assembly 27, a rear sprocket assembly 28, and a rear hub assembly 29 (an example of a bicycle hub assembly).

(Crank Assembly)

Figure 2:
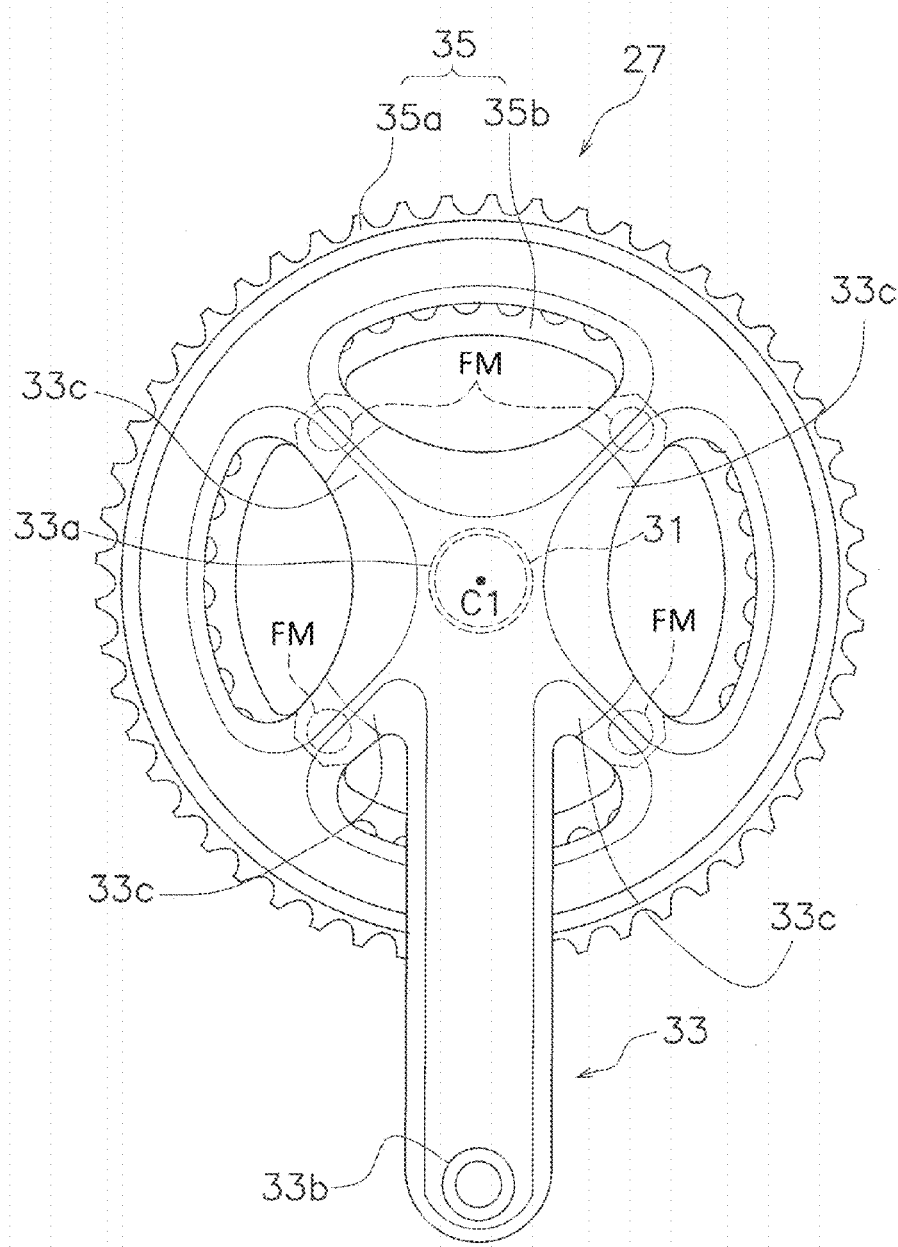
FIG. 2 is a side view of a crank assembly according to the embodiment.

As shown in FIG. 1, the crank assembly 27 is rotatably supported on a lower portion of the frame 11, for example, the bottom bracket hanger 12. As shown in FIG. 2, the crank assembly 27 mainly includes a crank axle 31, a right crank arm 33, a left crank arm (not shown), and the front sprocket assembly 35.

(Crank Axle and Crank Arm)

As shown in FIGS. 1 and 2, the crank axle 31 is rotatably supported on the bottom bracket hanger 12 via the bottom bracket assembly (not shown). As shown in FIG. 2, the right crank arm 33 and the left crank arm are mounted on the crank axle 31. For example, a right crank axle mounting portion 33a of the right crank arm 33 is fixedly attached to one end of the crank axle 31 with a spline engagement. The right crank axle mounting portion 33a is provided on one end of the right crank arm 33.

A left crank axle mounting portion (not shown) of the left crank arm is fixedly attached to the other end of the crank axle 31 with a spline engagement and an axle bolt. The left crank axle mounting portion is provided on one end of the left crank arm.

As shown in FIGS. 1 and 2, a pair of pedals 34 are attached to a pedal axle mounting portion 33b of the right crank arm 33 and a pedal axle mounting portion of the left crank arm respectively. The pedal axle mounting portions 33b of the right crank arm 33 is provided on the other end of the right crank arm 33. The pedal axle mounting portion of the left crank arm is provided on the other end of the left crank arm.

(Front Sprocket Assembly)

As shown in FIG. 2, the front sprocket assembly 35 is attached to the right crank arm 33 so as to be integrally rotatable with the right crank arm 33. Specifically, the front sprocket assembly 35 includes a rotational center axis C1, and is attached to the right crank arm 33 so as to be integrally rotatable with the crank arm 33 around the rotational center axis C1. The rotational center axis C1 of the front sprocket assembly 35 corresponds to a rotational center axis of crank axle 31.

The front sprocket assembly 35 includes at least one front sprocket. In this embodiment, the front sprocket assembly 35 includes two front sprockets 35a, 35b. The front sprockets 35a, 35b are attached to sprocket mounting portions 33c of the right crank arm 33 with fixing members FM such as a bolt and a nut.

(Rear Sprocket Assembly)

Figure 3:
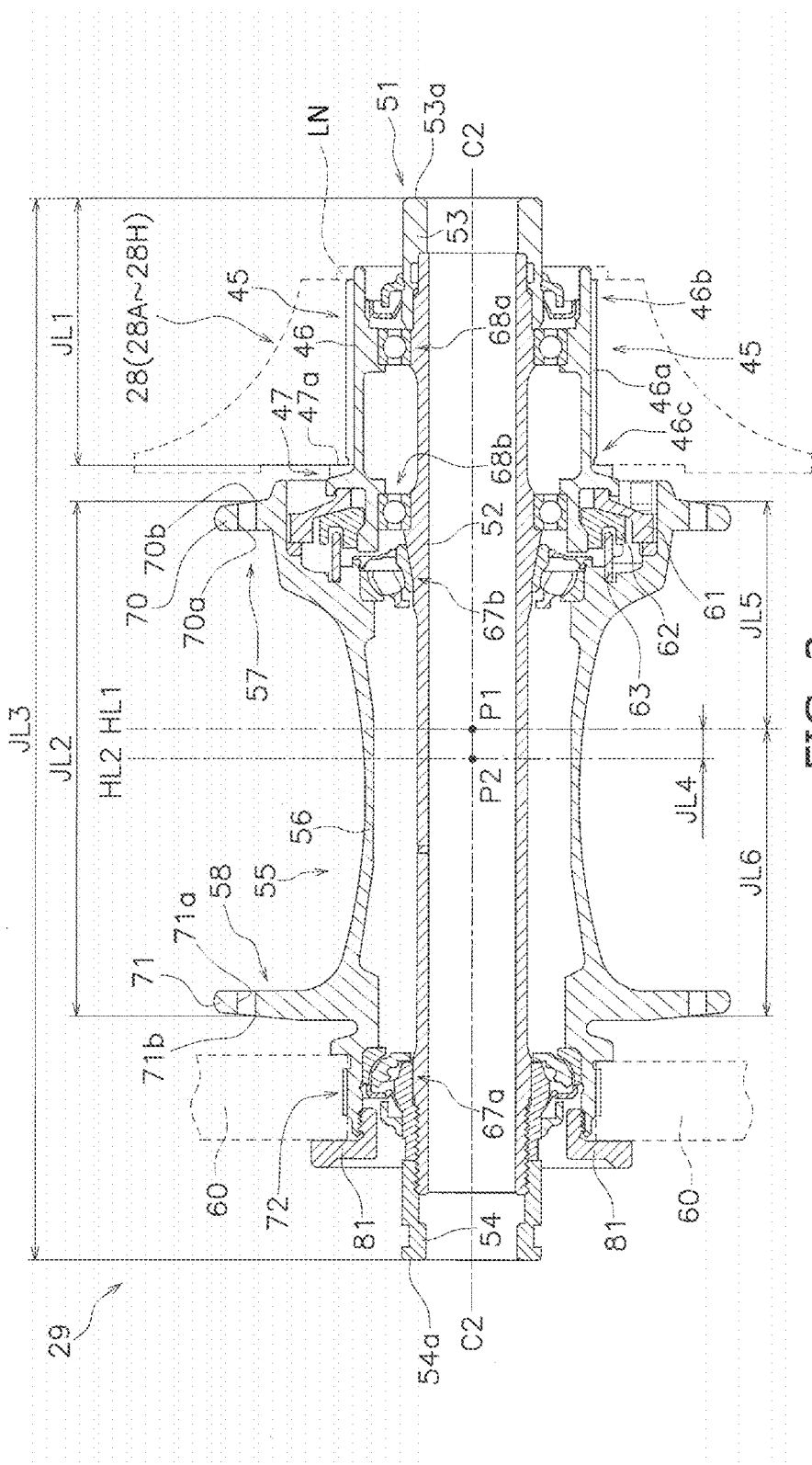
FIG. 3 is a cross-sectional view of a rear hub assembly according to the embodiment.
Figure 4:
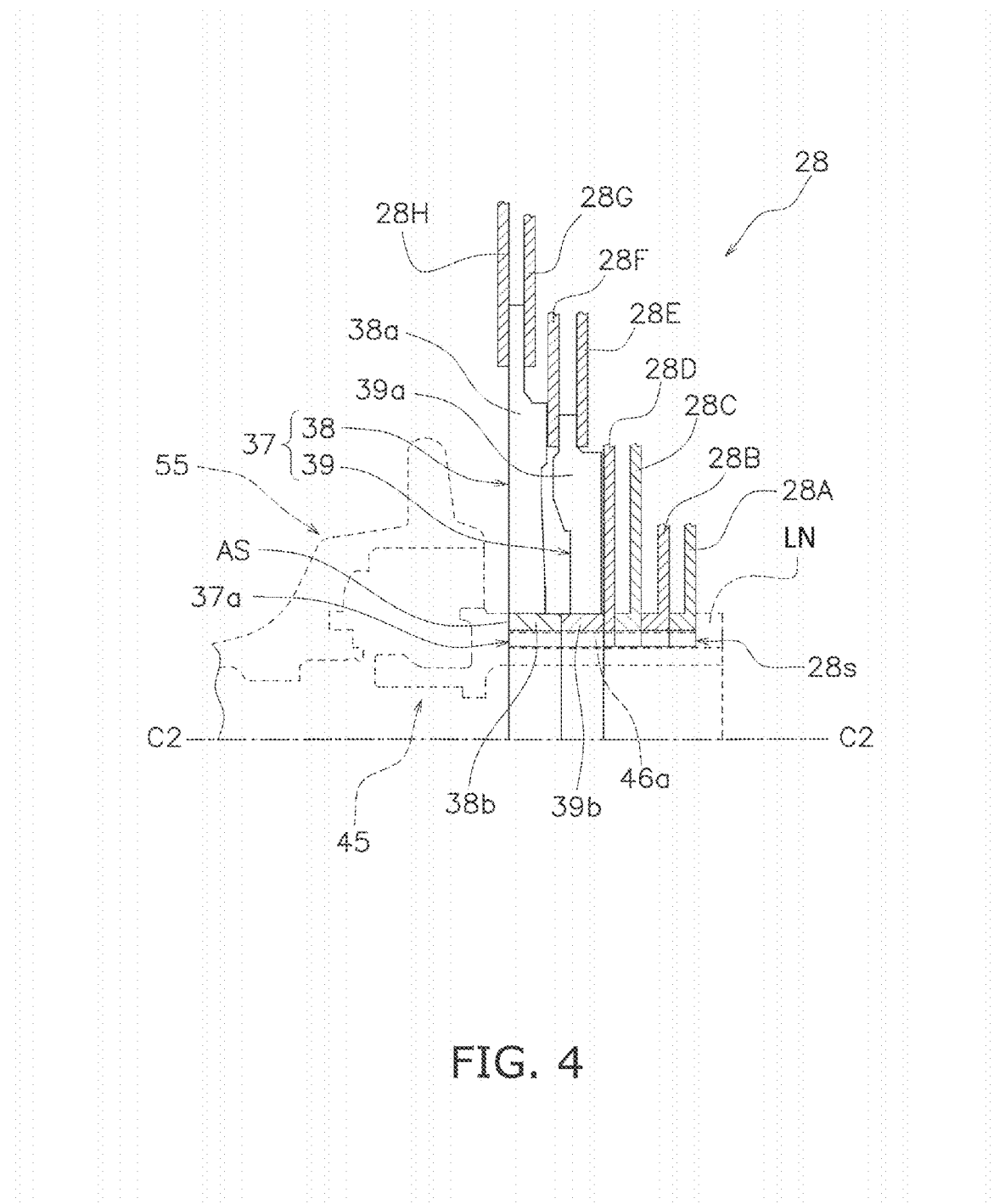
FIG. 4 is a cross-sectional view of sprocket support members according to the embodiment (bicycle rear sprockets are partly shown in FIG. 4 for the sake of brevity)

As shown in FIGS. 3 and 4, the rear sprocket assembly 28 is supported by a rear-sprocket supporting member 45 (as described below). The rear sprocket assembly 28 rotates with the rear-sprocket supporting member 45. Specifically, the rear sprocket assembly 28 includes a rotational center axis C2. The rear sprocket assembly 28 rotates with the rear-sprocket supporting member 45 around the rotational center axis C2. The rotational center axis C2 of the rear sprocket assembly 28 corresponds to a center axis of a rear hub axle 51 (an example of a hub axle).

As shown in FIG. 4, the rear sprocket assembly 28 includes eight rear sprockets 28A-28H. For example, the rear sprocket assembly 28 includes a first to an eighth rear sprockets 28A-28H. The first rear sprocket 28A is a smallest rear sprocket. The eighth rear sprocket 28H is a largest rear sprocket.

Specifically, the rear sprocket assembly 28 includes the first to eighth rear sprockets 28A-28H and a plurality of sprocket mounting members 37. Any one of the first to eighth rear sprockets 28A-28H is configured to be connected to the front sprocket assembly 35 (e.g. one of the front sprockets 35a, 35b) via the bicycle chain 9. Each of the sprocket mounting members 37 is configured to support at least one of the first to eighth rear sprockets 28A-28H and mount the at least one of the first to eighth rear sprockets 28A-28H to the rear-sprocket supporting member 45. In the illustrated embodiment, as shown in FIG. 4, each of the sprocket mounting members 37 supports the fifth to eighth rear sprockets 28E-28H and mounts the fifth to eighth rear sprockets 28E-28H to the rear-sprocket supporting member 45.

Also, as shown in FIG. 4, the rear sprocket assembly 28 includes an axial abutment surface AS that is configured to axially abut against the rear hub assembly 29 in a state where the rear sprocket assembly 28 is mounted to the rear hub assembly 29. In the embodiment, the sprocket mounting members 37 include the axial abutment surface AS. The axial abutment surface AS is explained in the description of "(Sprocket support members)" below.

(Rear Sprockets)

As shown in FIGS. 3 and 4, the first to eighth rear sprockets 28A-28H are arranged side by side in order in an axial direction parallel to the rotational center axis C1.

The first rear sprocket 28A is disposed on a side of the frame 11 (the rear end 11j of the frame body 11a) in the axial direction. The eighth rear sprocket 28H is disposed on a side of a rear hub shell 55 in the axial direction. The second to seventh rear sprockets 28B-28G are disposed between the first rear sprocket 28A and the eighth rear sprocket 28H in the axial direction.

The first to fourth rear sprockets 28A-28D are configured to be engaged with an outer peripheral surface of the rear-sprocket supporting member 45 with a spline engagement. The fifth to eighth rear sprockets 28E-28H are configured to be engaged with the rear-sprocket supporting member 45 via the plurality of the sprocket mounting members 37. For example, each of the plurality of sprocket mounting members 37 is engaged with an outer peripheral surface of the rear-sprocket supporting member 45 with a spline engagement. In this state, the first to eighth rear sprockets 28A-28H are retained on the rear-sprocket supporting member 45 with a lock nut LN in the axial direction.

(Sprocket Support Members)

The plurality of sprocket mounting members 37 support the fourth to eighth rear sprockets 28D-28H and are mounted to the rear-sprocket supporting member 45 respectively as above. As shown in FIG. 4, the plurality of sprocket mounting members 37 includes a first sprocket support member 38 and a second sprocket support member 39.

The first and the second sprocket support members 38, 39 are arranged side by side in the axial direction. Each of the first and second sprocket support members 38, 39 includes a plurality of arm portions 38a, 39a, and tubular portions 38b, 39b.

As shown in FIG. 4, the first sprocket support member 38 is disposed on a side of the rear hub shell 55. The first sprocket support member 38 is disposed between the rear hub shell 55 and the second sprocket support member 39 in the axial direction.

For example, the seventh and eighth sprockets 28G, 28H are fixed to the arm portions 38a of the first sprocket support member 38 by fixing members, such as fasteners. The tubular portion 38b of the first sprocket support member 38 is disposed between the rear hub shell 55 and tubular portions 39b of the second sprocket support members 39 in the axial direction. The tubular portion 38b of the first sprocket support member 38 is mounted to the rear-sprocket supporting member 45 with the spline engagement.

The tubular portion 38b of the first sprocket support member 38 is configured to axially abut against the rear hub assembly 29. Specifically, the tubular portion 38b of the first sprocket support member 38 includes an axial abutment surface AS. The axial abutment surface AS is configured to axially abut against the rear hub assembly 29 in a state where the rear sprocket assembly 28 is mounted to the rear hub assembly 29. The axial abutment surface AS is formed on an axial end portion of the tubular portion 38b of the first sprocket support member 38.

The second sprocket support member 39 is disposed between the first sprocket support members 38 and the fourth sprocket 28D in the axial direction. For example, the fifth and sixth rear sprockets 28E, 28F are fixed to the arm portions 39a of the second sprocket support member 39 by fixing members, such as fasteners. The tubular portion 39b of the second sprocket support member 39 is disposed between the tubular portions 38b and the fourth sprocket 28D in the axial direction. The tubular portion 39b of the second sprocket support member 39 is mounted to the rear-sprocket supporting member 45 with the spline engagement.

(Rear Hub Assembly)

As shown in FIG. 1, the rear hub assembly 29 (an example of the bicycle hub assembly) is mounted on a rear portion of the frame 11. Specifically, the rear hub assembly 29 is mounted between the pair of rear ends 11j in the axial direction, for example, the rear wheel 19 and the rear end 11j in the axial direction.

As shown in FIG. 3, the rear hub assembly 29 is configured to mount the rear sprocket assembly 28 thereto. The rear hub assembly 29 mainly includes the rear hub axle 51 (an example of a hub axle), a rear hub shell 55 (an example of a hub body), and the rear-sprocket supporting member 45.

The rear hub assembly 29 further includes the rotational center axis C2 and a first axial centerline HL1. The rotational center axis C2 corresponds to the center axis of the rear sprocket assembly 28 and the rear hub axle 51. The first axial centerline HL1 is explained in the description of "<Arrangements of the respective parts of the rear hub assembly>" below.

(Rear Hub Axle)

Both ends of the rear hub axle 51 are supported on the rear part of the frame 11, for example, the pair of the rear ends 11j of the frame body 11a (see FIG. 1) respectively. As shown in FIG. 3, the rear hub axle 51 includes a hub axle portion 52, a first abutting portions 53 including a first axial frame abutment surface 53a, and a second abutting portions 54 including a second axial frame abutment surface 54a. The hub axle portion 52 is formed in a substantially tubular shape.

The hub axle portion 52 rotatably supports the rear hub shell 55 via bearings 67a, 67b. The bearings 67a, 67b are mounted on an outer periphery surface of the hub axle portion 52 and rotatably support the rear hub shell 55. The hub axle portion 52 rotatably supports the rear-sprocket supporting member 45 via bearings 68a, 68b. The bearings 68a, 68b are mounted on an outer periphery surface of the hub axle portion 52 and rotatably support the rear-sprocket supporting member 45.

The first and second abutting portions 53, 54 are formed in a substantially tubular shape. The first and second abutting portions 53, 54 are attached to both end of the hub axle portion 52 respectively. For example, the first and second abutting portions 53, 54 are configured to contact outer periphery surfaces of both end of the hub axle portion 52 respectively. The first and second abutting portions 53, 54 respectively position the bearings 67a, 68a mounted on the both end side of the hub axle 51. For example, the first and second abutting portions 53, 54 respectively position inner rings of the bearings 67a, 68a.

The first abutting portion 53 is disposed between the rear-sprocket supporting member 45 and the rear part of the frame 11 (e.g. one of a pair of the rear ends 11j). The first abutting portion 53 includes the first axial frame abutment surface 53a.

The first axial frame abutment surface 53a is configured to abut against one of a pair of the rear ends 11j (an example of a first part of a bicycle frame) of the frame 11 in the axial direction in a state where the rear hub assembly 29 is mounted to the frame 11.

The first axial frame abutment surface 53a is positioned closer to the rear-sprocket supporting member 45 than a second axial frame abutment surface 54a (as described below) in the axial direction. The first axial frame abutment surface 53a is formed on one end of the rear hub axle 51 which is on the rear-sprocket supporting member 45 side.

For example, the first axial frame abutment surface 53a is formed on the first abutting portion 53. The first axial frame abutment surface 53a can also be directly formed on an end of the hub axle portion 52 if the rear hub axle 51 does not include the first abutting portions 53.

The second abutting portion 54 is disposed between the rear hub shell 55 and the rear part of the frame 11 (e.g. the other of the pair of the rear ends 11j). The second abutting portions 54 includes the second axial frame abutment surface 54a.

The second axial frame abutment surface 54a is configured to abut against the other of a pair of the rear ends 11j (an example of a second part of a bicycle frame) of the frame 11 in the state where the rear hub assembly 29 is mounted to the frame 11.

The second axial frame abutment surface 54a is positioned closer to the hub shell 55 than the first axial frame abutment surface 53a in the axial direction. The second axial frame abutment surface 54a is formed on the other end of the rear hub axle 51 which is on the opposite side of the rear-sprocket supporting member 45.

For example, the second axial frame abutment surface 54a is formed on the second abutting portion 54. The second axial frame abutment surface 54a can also be directly formed on an end of the hub axle portion 52 if the rear hub axle 51 does not include the second abutting portions 54.

In the above configuration, the rear hub axle 51 is mounted on the rear ends 11j with a wheel securing device (not shown). The wheel securing device is the substantially same as the conventional device.

For example, a shaft of a wheel securing device is inserted into a hollow portion of the rear hub axle portion 52 and passes through hollows of the first and second abutting portion 53, 54.

For example, one end of the shaft of the wheel securing device can be screwed into one of a pair of the rear ends 11j. A lever of the wheel securing device is attached to the other end of the shaft. The lever is arranged on the outside of the other of the pair of the rear ends 11j in the axial direction.

In this state, the rear hub axle portion 52 and the first and second abutting portions 53, 54 are clamped between the pair of the rear ends 11j by operating the lever.

(Rear Hub Shell)

As shown in FIG. 3, the rear hub shell 55 (an example of a hub body) is rotatably supported around the rear hub axle 51 with respect to the rotational center axis C2 of the rear hub assembly 29. For example, the rear hub shell 55 is rotatably mounted on the rear hub axle 51 (the hub axle portion 52) via bearings 67a, 67b.

The rear hub shell 55 includes a first hub flange 57 and a second hub flange 58 spaced apart from the first hub flange 57 in the axial direction. The rear hub shell also includes a hub shell body 56 positioned between the first hub flange 57 and the second hub flange 58 in the axial direction. The rear hub shell 55 further includes a second axial centerline HL2. The second axial centerline HL2 is explained in the description of "<Arrangements of the respective parts of the rear hub assembly>" below.

The hub shell body 56 is formed in a substantially tubular shape. The rear hub axle 51 is disposed in the hub shell body 56. The bearings 67a, 67b are disposed between the hub shell body 56 and the rear hub axle 51 in a radial direction with respect to the rotational center axis C2. Thus the hub shell body 56 is rotatably supported on the hub axle 51 via bearings 67a, 67b.

The first and second hub flanges 57, 58 are arranged on the hub shell body 56 at an interval in the axial direction. The first and second hub flanges 57, 58 are integrally formed on the hub shell body 56 so as to protrude from the hub shell body 56 in the radial direction with respect to the rotational center axis C2. The first and second hub flanges 57, 58 are respectively formed in a substantially annular shape when viewing from the rotational center axis C2.

The rear hub shell 55 further includes a first spoke-mounting portion 70 and a second spoke-mounting portion 71. The rear hub shell 55 also includes a disc-rotor mounting portion 72. Thus, the rear hub assembly 29 may further include the disc-rotor mounting portion 72.

The first spoke-mounting portion 70 is disposed on the first hub flange 57. The first spoke-mounting portion 70 is positioned closer to the rear-sprocket supporting member 45 than the second spoke-mounting portion 71 in the axial direction.

The second spoke-mounting portion 71 is disposed on the second hub flange 58. The second spoke-mounting portion 71 is positioned closer to the disc-rotor mounting portion 72 than the first spoke-mounting portion 70 in the axial direction.

Spokes are attached to the first spoke-mounting portion 70 and the second spoke-mounting portion 71. For example, the first spoke-mounting portion 70 includes a plurality of first bores 70a and a first axially outer part 70b.

Each of the first bores 70a passes through the first spoke-mounting portion 70 in the axial direction. Each of the first bores 70a is disposed at intervals in a circumferential direction with respect to the rotational center axis C1. A center of each of the first bores 70a is disposed at a predetermined interval from the rotational center axis C2 in the radial direction.

In the embodiment, the first axially outer part 70b is defined by the first bores 70a. For example, the first axially outer part 70b is defined by the outermost portion of the first bore 70a in the axial direction.

The second spoke-mounting portion 71 includes a plurality of second bores 71a and a second axially outer part 71b.

Each of the second bores 71a passes through the second spoke-mounting portion 71 in the axial direction. Each of the second bores 71a is disposed at intervals in a circumferential direction with respect to the rotational center axis C1.

A center of each of the second bores 71a is disposed at the predetermined interval from the rotational center axis C2 in the radial direction.

The second axially outer part 71b is defined by the second bores 71a. For example, the second axially outer part 71b is defined by the outermost portion of the second bore 71a in the axial direction.

Spokes are respectively attached to the first and second bores 70a, 71a of the first and second spoke-mounting portions 70, 71. In other words, the rear wheel 19 is attached to the first and second hub flanges 57, 58 via the spokes.

The disc-rotor mounting portion 72 is positioned opposite to the rear-sprocket supporting member 45 with respect to the rear hub shell 55 in the axial direction. In other words, the disc-rotor mounting portion 72 is positioned closer to the second hub flange 58 than the first hub flange 57 in the axial direction. For example, the disc-rotor mounting portion 72 is positioned adjacent to the second hub flange 58 in the axial direction.

A disc rotor 60 is attached to the disc-rotor mounting portion 72. For example, the disc rotor 60 is disposed on the disc-rotor mounting portion 72 with a spline engagement and is fixed on the rear hub shell 55 by a lock ring 81.

(Rear-Sprocket Supporting Member)

As described above, the rear-sprocket supporting member 45 is configured to support a plurality of the bicycle rear sprockets, for example, the eight rear sprockets 28A-28H.

As shown in FIGS. 3 and 4, the rear-sprocket supporting member 45 is rotatably supported around the hub axle 51 with respect to the rotational center axis C2. For example, the rear-sprocket supporting member 45 is arranged on the outside of the rear hub axle 51 (the hub axle portion 52) in the radial direction and is mounted on the hub axle 51 via bearings 68a, 68b.

Also, the rear-sprocket supporting member 45 rotates integrally with the rear hub shell 55 around the rotational center axis C2 of the rear hub axle 51. A rotational center axis of the rear-sprocket supporting member 45 corresponds to the rotational center axis C2 of the rear hub shell 55.

As shown in FIG. 3, the rear-sprocket supporting member 45 is formed in a substantially tubular shape. The rear-sprocket supporting member 45 includes at least one axially extending spline 46a. The at least one axially extending spline 46a is configured to engage with the plurality of bicycle rear sprockets 28A-28H.

In the illustrated embodiment, the rear-sprocket supporting member 45 includes a plurality of axially extending splines 46a. The plurality of axially extending splines 46a are directly engaged with the first to fourth rear sprockets 28A-28D. The plurality of axially extending splines 46a are engaged with the fifth to eighth rear sprockets 28E-28H via the each of the sprocket mounting members 38, 39.

The rear-sprocket supporting member 45 includes a first axial end 46b, a second axial end 46c opposite to the first axial end in the axial direction and an axially rear-sprocket abutment surface 47a positioned in the second axial end 46c.

Specifically, the rear-sprocket supporting member 45 includes a sprocket supporting body 46 and a sprocket abutment portion 47. The sprocket supporting body 46 is formed in a substantially tubular shape.

The rear hub axle 51 (the hub axle portion 52) is disposed in the sprocket supporting body 46. The bearing 68a, 68b is disposed between the sprocket supporting body 46 and the rear hub axle 51 in the radial direction. Thus the sprocket supporting body 46 is rotatably mounted on the hub axle 51 via bearings 68a, 68b.

The sprocket supporting body 46 includes the plurality of the axially extending splines 46a, the first axial end 46b, and the second axial end 46c.

The plurality of axially extending splines 46a are configured to engage with the plurality of the bicycle rear sprockets, for example, the first to eighth rear sprockets 28A-28H. For example, the plurality of axially extending splines 46a are engaged with splines 37a which are provided on an inner peripheral portion of each of the plurality of sprocket mounting members 37 (38, 39) and splines 28s which are provided on an inner peripheral portion of each of the rear sprockets 28A-28D.

The first axial end 46b is positioned closer to the frame 11 than the second axial end 46c in the axial direction. The second axial end 46c is opposite to the first axial end 46b in an axial direction parallel to the rotational center axis C2. The second axial end 46c is positioned closer to the rear hub shell 55 than the first axial end 46b in the axial direction.

The sprocket abutment portion 47 is configured to abut against the rear sprocket assembly 28. The sprocket abutment portion 47 is formed on the second axial end 46c of the sprocket supporting body 46. Specifically, the sprocket abutment portion 47 is integrally formed on the sprocket supporting body 46 so as to protrude from the sprocket supporting body 46 in the radial direction. The sprocket abutment portion 47 is preferably formed in a substantially annular shape.

The sprocket abutment portion 47 includes an axially rear-sprocket abutment surface 47a. The axially rear-sprocket abutment surface 47a is configured to abut against the rear sprocket assembly 28 in the axial direction in a state where the rear sprocket assembly 28 is mounted to the rear hub assembly 29.

The axially rear-sprocket abutment surface 47a is positioned in the second axial end 46c of the sprocket supporting body 46. Specifically, the axially rear-sprocket abutment surface 47a is formed on the sprocket abutment portion 47 on a plane substantially perpendicular to the rotational center axis C2. The axially rear-sprocket abutment surface 47a abuts against axial abutment surface AS of the first sprocket support member 38, for example, the axial abutment surface AS of the tubular portion 38b.

In the above configuration, the rear-sprocket supporting member 45 is attached to the rear hub shell 55 via a first and second positioning portions 61, 62. The first and second positioning portions 61, 62 are disposed between the rear-sprocket supporting member 45 and the rear hub shell 55 in the radial direction.

The first positioning portion 61 is engaged with the rear-sprocket supporting member 45 and the rear hub shell 55 so as to rotate integrally with the rear-sprocket supporting member 45 and the rear hub shell 55. The second positioning portion 62 is engaged with the rear-sprocket supporting member 45 and the first positioning portion 61 so as to rotate integrally with the rear-sprocket supporting member 45 and the first positioning portion 61.

A sealing member 63 is disposed between the second positioning portion 62 and the rear hub shell 55. The sealing member 63 is formed in a tubular shape. The sealing member 63 prevents a foreign matter to invade in the rear hub shell 55.

<Arrangements of the Respective Parts of the Rear Hub Assembly>

In the above rear hub assembly 29, the first and second axial centerlines HL1, HL2 and axial lengths are set as follows.

As shown in FIG. 3, the first axial centerline HL1 is defined between the first axial frame abutment surface 53a and the second axial frame abutment surface 54a. Specifically, the first axial centerline HL1 passes an axial center point P1 between the first axial frame abutment surface 53a and the second axial frame abutment surface 54a and is perpendicular to the rotational center axis C2.

The second axial centerline HL2 is defined between the first axially outer part 70b of the first spoke-mounting portion 70 and the second axially outer part 71b of the second spoke-mounting portion 71. Specifically, the second axial centerline HL2 passes an axial center point P2 between the first axially outer part 70b and the second axially outer part 71b and is perpendicular to the rotational center axis C2.

A first axial length JL1 is defined between the first axial frame abutment surface 53a and the axially rear-sprocket abutment surface 47a of the rear-sprocket supporting member 45 in the axial direction. In other words, the first axial length JL1 is a length between the first axial frame abutment surface 53a and the axially rear-sprocket abutment surface 47a in the axial direction.

The first axial length JL1 is smaller than or equal to 38.00 mm. Also, the first axial length JL1 is larger than or equal to 15.00 mm. Preferably, the first axial length JL1 is larger than or equal to 20.00 mm. Preferably, the first axial length JL1 is smaller than or equal to 37.00 mm. More preferably, the first axial length JL1 is smaller than or equal to 36.00 mm.

A second axial length JL2 is defined between the first axially outer part 70b of the first spoke-mounting portion 70 and the second axially outer part 71b of the second spoke-mounting portion 71 in the axial direction. In other words, the second axial length JL2 is a length between the first axially outer part 70b and the second axially outer part 71b in the axial direction.

The second axial length JL2 is larger than or equal to 55.00 mm. Preferably, the second axial length JL2 is larger than or equal to 60.00 mm. More preferably, the second axial length JL2 is larger than or equal to 64.00 mm. Also, the second axial length JL2 is smaller than or equal to 85.00 mm. Preferably, the second axial length JL2 is smaller than or equal to 80.00 mm. Preferably, the second axial length JL2 is smaller than or equal to 70.00 mm.

A third axial length JL3 is defined between the first axial frame abutment surface 53a and the second axial frame abutment surface 54a in the axial direction. In other words, the third axial length JL3 is a length between the first axial frame abutment surface 53a and the second axial frame abutment surface 54a in the axial direction.

The third axial length JL3 is larger than or equal to 130.00 mm. Also, the third axial length JL3 is smaller than or equal to 145.00 mm.

A fourth axial length JL4 is defined between the first axial centerline HL1 and the second axial centerline HL2 in the axial direction. In other words, the fourth axial length JL4 is a length between the first axial centerline HL1 and the second axial centerline HL2 in the axial direction.

The fourth axial length JL4 is smaller than or equal to 6.00 mm. Preferably, the fourth axial length JL4 is smaller than or equal to 5.00 mm. More preferably, the fourth axial length JL4 is smaller than or equal to 0.00 mm.

A fifth axial length JL5 is defined between the first axial centerline HL1 and the first axially outer part 70b of the first spoke-mounting portion 70 in the axial direction. In other words, the fifth axial length JL5 is a length between the first axial centerline HL1 and the first axially outer part 70b in the axial direction.

A sixth axial length JL6 is defined between the first axial centerline HL1 and the second axially outer part 71b of the second spoke-mounting portion 71 in the axial direction. In other words, the sixth axial length JL6 is a length between the first axial centerline HL1 and the second axially outer part 71b in the axial direction. The fifth axial length JL5 can be smaller than the sixth axial length JL6. Further, the fifth axial length JL5 can be equal to the sixth axial length JL6.

Second Embodiment

A configuration of second embodiment is substantially the same as the configuration of the first embodiment, except the first to third axial lengths JL1-JL3.

In the second embodiment, an explanation of the same configuration as the first embodiment is omitted. The omitted configuration is equivalent to the configuration described in the first embodiment.

In the second embodiment, the first to third axial lengths JL1-JL3 are set as follows.

As shown in FIG. 3, a first axial length JL1 is defined between the first axial frame abutment surface 53a and the axially rear-sprocket abutment surface 47a of the rear-sprocket supporting member 45 in the axial direction. The first axial length JL1 is smaller than or equal to 40.00 mm. The first axial length JL1 is smaller than or equal to 38.00 mm.

A second axial length JL2 is defined between the first axially outer part 70b of the first spoke-mounting portion 70 and the second axially outer part 71b of the second spoke-mounting portion 71 in the axial direction. The second axial length JL2 is larger than or equal to 60.00 mm.

A third axial length JL3 is defined between the first axial frame abutment surface 53a and the second axial frame abutment surface 54a. The third axial length JL3 is larger than 140.00 mm and smaller than or equal to 150.00 mm.

A fourth axial length JL4, a fifth axial length JL5, and a sixth axial length JL6 can be set to the same as ones of the first embodiment.

Third Embodiment

A configuration of third embodiment is substantially the same as the configuration of the first embodiment, except the first to third axial lengths JL1-JL3.

In the third embodiment, an explanation of the same configuration as the first embodiment is omitted. The omitted configuration is equivalent to the configuration described in the first embodiment.

In the third embodiment, the first to third axial lengths JL1-JL3 are set as follows.

As shown in FIG. 3, a first axial length JL1 is defined between the first axial frame abutment surface 53a and the axially rear-sprocket abutment surface 47a of the rear-sprocket supporting member 45 in the axial direction.

The first axial length JL1 is smaller than or equal to 40.00 mm. The first axial length JL1 is smaller than or equal to 38.00 mm.

A second axial length JL2 is defined between the first axially outer part 70b of the first spoke-mounting portion 70 and the second axially outer part 71b of the second spoke-mounting portion 71 in the axial direction. The second axial length JL2 is larger than or equal to 70.00 mm.

A third axial length JL3 is defined between the first axial frame abutment surface 53a and the second axial frame abutment surface 54a. The third axial length JL3 is larger than 148.00 mm and smaller than or equal to 160.00 mm.

A fourth axial length JL4, a fifth axial length JL5, and a sixth axial length JL6 can be set to the same as ones of the first embodiment.

Other Embodiments (A) In the embodiment, explanation is performed as an example that the rear hub axle 51 includes the hub axle portion 52 and the abutting portions 53. Instead of this, the rear hub axle 51 can be formed as a unitary member. In this case, for example, the hub axle portion 52 and the abutting portions 53 is integrally formed as a unitary, one-piece member. Also, positioning members are attached to the both ends of the rear hub axle 51 respectively. The inner rings of the bearings 67a, 68a is positioned by the positioning members.

(B) In the embodiment, explanation is performed as an example that the axially rear-sprocket abutment surface 47a abuts against the first sprocket support member 38. Instead of this, the axially rear-sprocket abutment surface 47a can abut against the eighth rear sprocket 28H. In this case, for example, the rear sprocket assembly 28 is directly attached to the rear-sprocket supporting member 45 via the splines without the plurality of sprocket mounting members 37. In this state, the axially rear-sprocket abutment surface 47a abuts against the eighth rear sprocket 28H.

(C) In the embodiment, explanation is performed as an example that the eight rear sprockets (the first to eighth rear sprockets 28A-28H) are mounted on the rear-sprocket supporting member 45. Instead of this, the number of rear sprockets can be smaller than eight or larger than eight.

(D) In the embodiment, explanation is performed as an example that the total number of the front sprocket is two. The number of the front sprocket is not restricted to the embodiment but can be set optionally one, or more than or equal to three.

(E) In the embodiment, explanation is performed as an example that the rear hub shell included the first hub flange 57 and the second hub flange 58. Alternatively, the first hub flange 57 and the second hub flange 58 can be omitted. In such a case, the first spoke-mounting portion 70 and the second spoke-mounting portion 71 can be directly provided to the hub shell body 56 so that the first spoke-mounting portion 70 and the second spoke-mounting portion 71 are spaced apart from each other in the axial direction. Accordingly, the first bores 70a and the second bores 71a are also be directly provided to the hub shell body 56 so that each of the first bores 70a and the second bores 71a extends in an radial direction with respect to the rotational center axis C2. Even in the case, the first axially outer part 70b can be defined by the outermost portion of the first bore 70a in the axial direction, and the second axially outer part 71b can be defined by the outermost portion of the second bore 71a in the axial direction.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The foregoing also applies to words having similar meanings such as the terms, "including", "having" and their derivatives. Also, the terms "part," "section," "portion," "member" or "element" when used in the singular can have the dual meaning of a single part or a plurality of parts.

Also as used herein to describe the above embodiment(s), the following directional terms "forward", "rearward", "above", "downward", "vertical", "horizontal", "below", "transverse", "inward" and "outward" as well as any other similar directional terms refer to those directions of the bicycle hub assembly in a state where the bicycle hub assembly are mounted to a bicycle. Accordingly, these terms, as utilized to describe the present technology should be interpreted relative to the bicycle hub assembly.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims.

For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time.

Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

What is claimed is:

1. A bicycle hub assembly configured to mount a bicycle rear sprocket assembly thereto, the bicycle hub assembly comprising:
   a hub axle;
   a hub body rotatably supported around the hub axle with respect to a rotational center axis of the bicycle hub assembly, the hub body including a first spoke-mounting portion having a first axially outer part and a second spoke-mounting portion having a second axially outer part; and a rear-sprocket supporting member rotatably supported around the hub axle with respect to the rotational center axis, the rear-sprocket supporting member being configured to support a plurality of bicycle rear sprockets and including a first axial end, a second axial end opposite to the first axial end in an axial direction parallel to the rotational center axis and an axially rear-sprocket abutment surface positioned in the second axial end, the second axial end being positioned closer to the hub body than the first axial end in the axial direction;

the hub axle including:
a first axial frame abutment surface configured to abut against a first part of a bicycle frame in the axial direction in a state where the bicycle hub assembly is mounted to the bicycle frame; and
a second axial frame abutment surface configured to abut against a second part of the bicycle frame in the axial direction in the state where the bicycle hub assembly is mounted to the bicycle frame; wherein
the first axial frame abutment surface being positioned closer to the rear-sprocket supporting member than the second axial frame abutment surface in the axial direction; and wherein
a first axial length defined between the first axial frame abutment surface and the axially rear-sprocket abutment surface of the rear-sprocket supporting member in the axial direction is smaller than or equal to 38.00 mm; and
a second axial length defined between the first axially outer part of the first spoke-mounting portion and the second axially outer part of the second spoke-mounting portion in the axial direction is larger than or equal to 55.00 mm.

2. The bicycle hub assembly according to claim 1, wherein
a third axial length is defined between the first axial frame abutment surface and the second axial frame abutment surface.

3. The bicycle hub assembly according to claim 2, wherein
the third axial length is smaller than or equal to 145.00 mm.

4. The bicycle hub assembly according to claim 3, wherein
the third axial length is larger than or equal to 130.00 mm.

5. The bicycle hub assembly according to claim 1, wherein
the first axial length is smaller than or equal to 37.00 mm.

6. The bicycle hub assembly according to claim 1, wherein
the first axial length is smaller than or equal to 36.00 mm.

7. The bicycle hub assembly according to claim 1, wherein
the first axial length is larger than or equal to 15.00 mm.

8. The bicycle hub assembly according to claim 1, wherein
the first axial length is larger than or equal to 20.00 mm.

9. The bicycle hub assembly according to claim 1, wherein
the second axial length is larger than or equal to 60.00 mm.

10. The bicycle hub assembly according to claim 1, wherein
the second axial length is larger than or equal to 64.00 mm.

11. The bicycle hub assembly according to claim 1, wherein
the second axial length is smaller than or equal to 85.00 mm.

12. The bicycle hub assembly according to claim 1, wherein
the second axial length is smaller than or equal to 80.00 mm.

13. The bicycle hub assembly according to claim 1, wherein
the second axial length is smaller than or equal to 70.00 mm.

14. The bicycle hub assembly according to claim 1, further comprising:
a first axial centerline defined between the first axial frame abutment surface and the second axial frame abutment surface in the axial direction; wherein
the hub body includes a second axial centerline defined between the first axially outer part of the first spoke-mounting portion and the second axially outer part of the second spoke-mounting portion.

15. The bicycle hub assembly according to claim 14, wherein
a fourth axial length defined between the first axial centerline and the second axial centerline in the axial direction is smaller than or equal to 6.00 mm.

16. The bicycle hub assembly according to claim 15, wherein
the fourth axial length is smaller than or equal to 5.00 mm.

17. The bicycle hub assembly according to claim 15, wherein
the fourth axial length is smaller than or equal to 0.00 mm.

18. The bicycle hub assembly according to claim 14, wherein
the first spoke-mounting portion being positioned closer to the rear-sprocket supporting member than the second spoke-mounting portion in the axial direction; and
a fifth axial length defined between the first axial centerline and the first axially outer part of the first spoke-mounting portion is smaller than a sixth axial length defined between the first axial centerline and the second axially outer part of the second spoke-mounting portion.

19. The bicycle hub assembly according to claim 14, wherein
the first spoke-mounting portion being positioned closer to the rear-sprocket supporting member than the second spoke-mounting portion in the axial direction; and
a fifth axial length defined between the first axial centerline and the first axially outer part of the first spoke-mounting portion is equal to a sixth axial length defined between the first axial centerline and the second axially outer part of the second spoke-mounting portion.

20. The bicycle hub assembly according to claim 1, further comprising:
a disc-rotor mounting portion.

21. The bicycle hub assembly according to claim 20, wherein
the disc-rotor mounting portion is positioned opposite to the rear-sprocket supporting member with respect to the hub body in the axial direction.

22. The bicycle hub assembly according to claim 20, wherein
the hub body includes a first hub flange and a second hub flange spaced apart from the first hub flange in the axial direction;
the first spoke-mounting portion is disposed on the first hub flange; and the second spoke-mounting portion is disposed on the second hub flange.

23. The bicycle hub assembly according to claim 1, wherein
the rear-sprocket supporting member includes at least one axially extending spline configured to engage with the plurality of bicycle rear sprockets.

24. The bicycle hub assembly according to claim 23, wherein
the at least one axially extending spline includes a plurality of axially extending splines.

25. A bicycle hub assembly configured to mount a bicycle rear sprocket assembly thereto, the bicycle hub assembly comprising:
a hub axle;
a hub body rotatably supported around the hub axle with respect to a rotational center axis of the bicycle hub assembly, the hub body including a first spoke-mounting portion having a first axially outer part and a second spoke-mounting portion having a second axially outer part; and
a rear-sprocket supporting member rotatably supported around the hub axle with respect to the rotational center axis, the rear-sprocket supporting member being configured to support a plurality of bicycle rear sprockets and including a first axial end, a second axial end opposite to the first axial end in an axial direction parallel to the rotational center axis and an axially rear-sprocket abutment surface positioned in the second axial end, the second axial end being positioned closer to the hub body than the first axial end in the axial direction;
the hub axle including:
a first axial frame abutment surface configured to abut against a first part of a bicycle frame in the axial direction in a state where the bicycle hub assembly is mounted to the bicycle frame; and
a second axial frame abutment surface configured to abut against a second part of the bicycle frame in the axial direction in the state where the bicycle hub assembly is mounted to the bicycle frame;
the first axial frame abutment surface being positioned closer to the rear-sprocket supporting member than the second axial frame abutment surface in the axial direction; and wherein
a first axial length defined between the first axial frame abutment surface and the axially rear-sprocket abutment surface of the rear-sprocket supporting member in the axial direction is smaller than or equal to 40.00 mm;
a second axial length defined between the first axially outer part of the first spoke-mounting portion and the second axially outer part of the second spoke-mounting portion in the axial direction is larger than or equal to 60.00 mm; and
a third axial length defined between the first axial frame abutment surface and the second axial frame abutment surface is larger than 140.00 mm and smaller than or equal to 150.00 mm.

26. The bicycle hub assembly according to claim 25, wherein
the first axial length is smaller than or equal to 38.00 mm.

27. A bicycle hub assembly configured to mount a bicycle rear sprocket assembly thereto, the bicycle hub assembly comprising:
a hub axle;
a hub body rotatably supported around the hub axle with respect to a rotational center axis of the bicycle hub assembly, the hub body including a first spoke-mounting portion having a first axially outer part and a second spoke-mounting portion having a second axially outer part; and
a rear-sprocket supporting member rotatably supported around the hub axle with respect to the rotational center axis, the rear-sprocket supporting member being configured to support a plurality of bicycle rear sprockets and including a first axial end, a second axial end opposite to the first axial end in an axial direction parallel to the rotational center axis and an axially rear-sprocket abutment surface positioned in the second axial end, the second axial end being positioned closer to the hub body than the first axial end in the axial direction;
the hub axle including:
a first axial frame abutment surface configured to abut against a first part of a bicycle frame in the axial direction in a state where the bicycle hub assembly is mounted to the bicycle frame; and
a second axial frame abutment surface configured to abut against a second part of the bicycle frame in the axial direction in the state where the bicycle hub assembly is mounted to the bicycle frame;
the first axial frame abutment surface being positioned closer to the rear-sprocket supporting member than the second axial frame abutment surface in the axial direction; and wherein
a first axial length defined between the first axial frame abutment surface and the axially rear-sprocket abutment surface of the rear-sprocket supporting member in the axial direction is smaller than or equal to 40.00 mm;
a second axial length defined between the first axially outer part of the first spoke-mounting portion and the second axially outer part of the second spoke-mounting portion in the axial direction is larger than or equal to 70.00 mm; and
a third axial length defined between the first axial frame abutment surface and the second axial frame abutment surface is larger than 148.00 mm and smaller than or equal to 160.00 mm.

28. The bicycle hub assembly according to claim 27, wherein
the first axial length is smaller than or equal to 38.00 mm.

* * * * *